DYSON & MACQUEEN.
Corn Harvester.

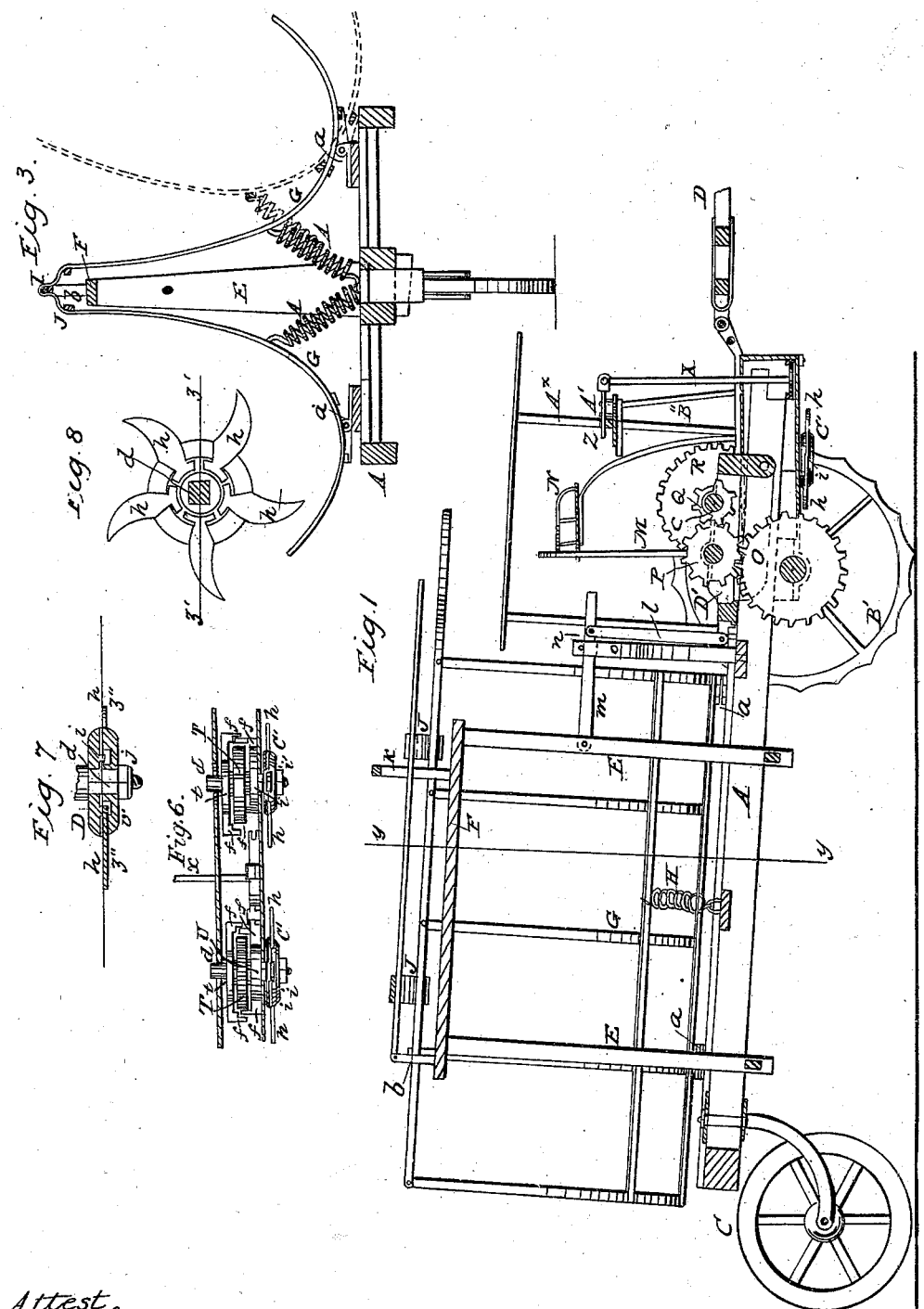

No. 55,840.

2 Sheets—Sheet 2.

Patented June 26, 1866.

UNITED STATES PATENT OFFICE.

ABRAHAM DYSON AND WILLIAM N. MACQUEEN, OF ST. LOUIS, MISSOURI.

IMPROVEMENT IN CORN-HARVESTERS.

Specification forming part of Letters Patent No. 55,840, dated June 26, 1866.

*To all whom it may concern:*

Be it known that we, ABRAHAM DYSON and WILLIAM N. MACQUEEN, of St. Louis, in the county of St. Louis and State of Missouri, have invented a new and Improved Machine for Harvesting Corn, Cotton, Sugar-Cane, and other similar crops grown in hills and drills; and we do hereby declare that the following is a full, clear, and exact description thereof, which will enable those skilled in the art to make and use the same, reference being had to the accompanying drawings, forming part of this specification, in which—

Figure 5:
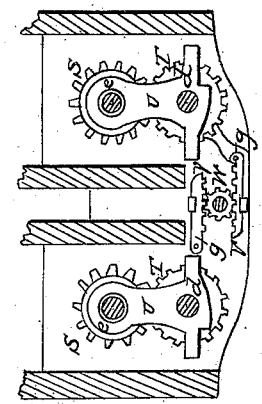
Figure 4:
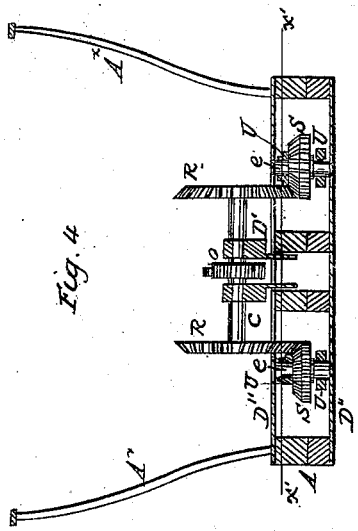
Figure 2:
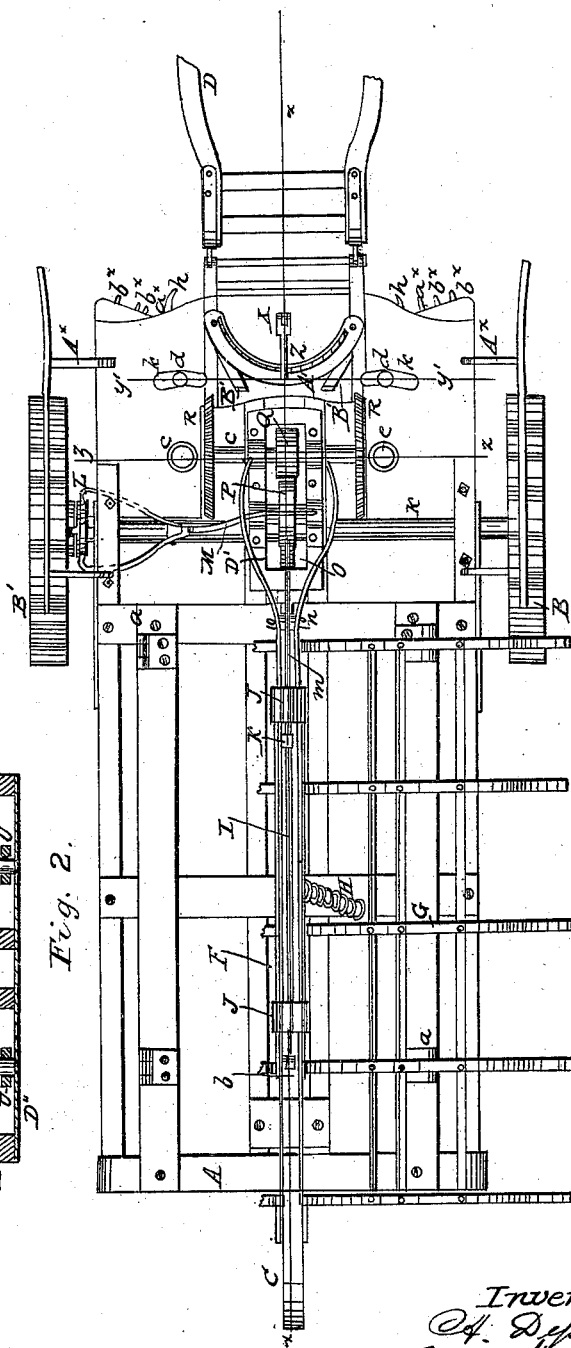

Figure 1 is a side sectional view of our invention, taken in the line $x\ x$, Fig. 2; Fig. 2, a plan or top view of the same; Fig. 3, a transverse section of the same, taken in the line $y\ y$, Fig. 1; Fig. 4, a transverse section of the same, taken in the line $z\ z$, Fig. 2; Fig. 5, a horizontal section of Fig. 4, taken in the line $x'\ x'$; Fig. 6, a transverse vertical section of the device, taken in the line $y'\ y'$, Fig. 2; Fig. 7, a detached vertical section of one of the rotary cutters, taken in the line $z'\ z'$, Fig. 8; Fig. 8, a horizontal section of Fig. 7, taken in the line $z''\ z''$, Fig. 7.

Similar letters of reference indicate corresponding parts.

This invention relates to a new and improved machine for cutting standing corn, cotton, sugar-cane, and other similar crops which are grown in hills or drills.

The object of the invention is to obtain a device for the purpose specified, which will perform the work efficiently, admit of the cutting devices being adjusted to suit the width of the spaces between the rows of plants, and also admit of the cut stalks or plants being discharged in gavels or bundles of the desired size.

A represents a rectangular frame, the front part of which is supported by two wheels, B B', and the rear part supported by a caster-wheel, C.

D are thills attached to the front end of the frame A, and E E are uprights attached centrally to the frame A, and having their upper ends connected by a bar, F.

G G represent two racks, which receive the cut stalks or plants. These racks may be constructed of wood or metal, and they are of curved form transversely, as shown clearly in Fig. 3. The racks are attached by hinges or joints $a$ to the frame A, a rack being at each side of the uprights E E, and each rack has a spring, H, attached to its rear side, said springs having a tendency to keep the racks in an upright position, so that they may receive and hold the cut stalks or plants, and when said racks have been tilted over to discharge their load, as shown in red, Fig. 3, to bring back the racks to an upright position. Fenders or guides $A^\times$ are placed on the front part of frame A at each side, to direct the cut stalks or plants to the racks.

The racks G G are prevented from being casually tilted by means of a lever, I, one end of which is connected by a fulcrum-pin to a short upright, $b$, on bar F, said lever having one or more clamps, J, attached to it, to fit over the upper edges of the racks G when the lever I is pressed down. This lever I passes through an upright guide, K, on bar F, said guide having elastic sides to press against the lever and, by means of friction, retain or hold it either in a raised or lowered position.

When it is desired to discharge the load from the racks the driver raises the lever I, so that the clamps J will be free from the upper edges of the racks G, and then tilts the racks over, so that the load will be discharged.

The bar F serves as a bearing for the racks G G when the latter are in an upright position.

The two front wheels, B B', are fitted on one and the same axle K', one wheel, B, being permanently secured to the axle, and the other, B', being placed loosely upon it and connected with the axle, when necessary, by a clutch, L, operated by a lever, M, the latter being at the rear of the driver's seat N. (See Figs. 1 and 2.)

On the axle K' there is keyed a toothed wheel, O, which gears into a pinion, P, above it, and this pinion gears into a wheel, Q, on a shaft, $c$, said shaft having a bevel-wheel, R, on each end of it. The wheels R R gear into bevel-pinions S S underneath them, and these bevel-pinions have vertical teeth below their inclined or beveled ones, as shown in Fig. 4. The vertical teeth of these bevel-pinions gear into wheels T, the shafts $d$ of which have their bearings in plates U U, which are fitted loosely on the shafts $e\ e$ of the pinions S S, said pinions being between the plates U U as well as the wheels T T.

The front ends of the plates U are provided with lips or flanges $f$, as shown clearly in Fig. 6, the flanges of the lower plates extending upward between the flanges of the upper plates, so that if the lower plates U be moved either to the right or left a corresponding motion will be imparted to the upper ones, the plates U working on the shaft $e\,e$ of the pinions S as centers.

To the front end of each of the lower plates U there is connected, by a pivot, $g$, a rack, V. These racks are parallel with each other, and a pinion, W, gears into both of them, said pinion being on the lower end of a vertical shaft, X, which extends upward in front of the driver's seat N, and has a lever, Z, pivoted to its upper end for the convenience of turning it, a notched semicircular bar, A', being attached to the upper ends of uprights B'', in any of which notches the lever Z may be fitted to hold the shaft X, and consequently the plates U, in the desired position.

On the lower ends of the shafts $d\,d$ of the wheels T T the rotary cutters C' are attached. These cutters are constructed of a series of curved blades, $h$, (see Fig. 8,) the inner ends of which are clamped between two parts, $i\,i'$, of a hub, D, by means of a nut, $j$. (See Fig. 7.) The hubs D are fitted on squares on the shafts $d$, so that the former cannot turn on the latter, and the lower parts, $i'$, of the hubs are notched to receive the inner parts of the blades.

The rotary cutters C' are placed at the front end of the machine, near each corner thereof, the blades $h$ in their rotation extending a little in front of the front end of the machine, which is made of concave form directly over each cutter, as shown at $a^x$, one side of the concaves being provided with pins or teeth $b^x$, to hold the stalks or plants and prevent them from slipping under the action of the blades. (See Fig. 2.)

The gearing S S T T and plates U are inclosed between plates D'', secured to the upper and under sides of the frame A, curved slots K being made in said plates to admit of the plates U, and consequently the cutters C', being moved laterally under the pinion W and racks V V. This arrangement of gearing therefore, it will be seen, is to adjust the cutters C' a greater or less distance apart to suit the width of the spaces between the rows of plants, which may be done with the greatest facility by turning the shaft X.

In order to facilitate the turning of the machine the wheel B' is disconnected from the axle K by moving lever M.

The cutters C' may be rendered inoperative at any time by raising the pinion P free from the toothed wheel O, the shaft of said pinion, with those of the wheels Q R R, being in a frame, D', the front end of which is connected by a pivot to frame A. The rear end of the frame D' is connected by a bar, $l$, with a lever, $m$, by which the rear end of said frame is raised and the pinion P thrown out of gear with wheel O. This lever $m$ may be retained in an elevated or depressed state by a pin, $n$, passing through guides $o\,o$, between which said lever works.

This device is drawn along with the draft-animal walking between the rows of plants.

Having thus described our invention, what we claim as new, and desire to secure by Letters Patent, is—

1. The rotary cutters C', arranged at the front end of the machine, with the plates U, gearing, and the racks and pinion, substantially as shown and described, to admit of the lateral adjustment of the cutters to suit the width of the spaces between the rows of stalks or plants, as set forth.

2. The particular manner of constructing the rotary cutters C', to wit: by having blades $h$ fitted between the two parts $i'\,i'$ of a hub, D, which parts are secured in contact by a screw-nut, $j$, one of the parts being notched to receive the inner ends of the blades $h$, substantially as shown and described.

3. The arrangement of the racks G G, fenders $A^x$, frame A, and cutters C', relatively with each other, and operating in the manner and for the purposes herein specified.

4. The lever I, provided with the clamps J, and arranged, relatively with the upper edges of the racks G, as shown and described, for the purpose of preventing the casual tilting of the racks, as described.

ABRAHAM DYSON.
WM. NAIRN MACQUEEN.

Witnesses:
FREDERICK WEINHEIM,
B. LAIBOLDT.